United States Patent Office 3,150,129
Patented Sept. 22, 1964

3,150,129
PHENTHIAZINE DERIVATIVES AND PROCESSES
FOR THEIR PREPARATION
Robert Michel Jacob, Ablon-sur-Seine, and Jacques
Georges Robert, Gentilly, France, assignors to Rhone-
Poulenc S.A., Paris, France, a corporation of France
No Drawing. Filed Apr. 5, 1962, Ser. No. 185,194
Claims priority, application France Oct. 21, 1957
1 Claim. (Cl. 260—243)

This invention relates to new phenthiazine derivatives and to their preparation. This application is a continuation-in-part of application Serial No. 767,797, filed October 17, 1958, now United States Patent No. 3,075,976.

During especially the past decade, considerable research and experimentation have been conducted in the field of N-substituted phenthiazine derivatives and certain of these compounds have been found to possess valuable therapeutic properties. Some are useful primarily on account of outstanding antihistaminic activity, others because of their unusually powerful effect as potentiators of drugs which act upon the nervous system and of their efficacy as anti-shock agents and yet others, for example, are effective agents for controlling or minimising motion-sickness. It has nevertheless been demonstrated that of the very large number of possible N-substituted phenthiazine compounds that have been proposed or tested by various workers, only comparatively few types have useful application in human or veterinary medicine and that both the nature and the degree of useful effect can radically alter even with apparently small changes in chemical structure.

It is an object of the present invention to provide a new phenthiazine derivative, and its acid addition salts, which possess unexpectedly useful pharmacological properties. It is a further object of the invention to provide processes for the preparation of the new compound and its acid addition salts.

According to the present invention there is provided, as a new chemical compound, the compound 3-methylthio-10 - [3 - (4 - hydroxymethyl-1-piperidyl)propyl]phenthiazine, which has the formula:

and the acid addition salts thereof having therapeutically acceptable anions.

The said compound, and its said acid addition salts are valuable therapeutic substances. In particular they are valuable neuroleptics and have in addition an exceptional anti-emetic activity.

The basic compound may be prepared, for example, by interaction of a phenthiazine derivative of the formula:

where Y represents the acid residue of a reactive ester, such as a halogen atom or a sulphonic or sulphuric ester, with 4-hydroxymethylpiperidine of the formula:

The aforesaid reaction may be carried out with or without a solvent in the presence or absence of an alkaline condensing agent and optionally at an elevated temperature. The preferred condensing agents are alkali metals and their amides or hydrides.

For therapeutic purposes the new compound of this invention, 3 - methyl-thio-10-[3-(4-hydroxymethyl-1-piperidyl)propyl]phenthiazine, may be used as such or in the form of non-toxic acid addition salts, i.e., salts which have therapeutically acceptable anions in the sense that the anions are relatively innocuous to the animal organism in therapeutic doses so that the beneficial physiological properties inherent in the bases are not vitiated by side effects ascribable to the anions. Suitable such salts are, for example, the hydrochlorides and other hydrohalides, phosphates, nitrates, sulphates, maleates, fumarates, citrates, tartrates, methanesulphonates and ethanedisulphonates.

The following example will serve to illustrate the production of the compound according to the invention:

*Example*

3 - methylthio-10-(3-methanesulphonyloxypropyl)phenthiazine (13.5 g.) and 4-hydroxymethyl piperidine (6.9 g.) in toluene (80 cc.) were heated under reflux for seven hours with stirring. The reaction mixture was allowed to cool and water (50 cc.) was added. The resulting toluene solution layer was decanted and washed twice with water (each 25 cc.). The toluene solution was then stirred with 5% hydrochloric acid (100 cc.). The hydrochloride of the desired phenthiazine base precipitated in gummy condition in the aqueous layer. This was decanted and treated with sodium hydroxide (25 cc., density 1.33). It was then extracted three times with ethyl acetate (50 cc., 25 cc., and 25 cc.). The extracts were dried over sodium sulphate, filtered and concentrated in vacuo. A resinous product (6.5 g.) was obtained.

This product was dissolved in a mixture of benzene (80 cc.) and cyclohexane (80 cc.) and chromatographed on a column containing 50 g. alumina. The chromatographed product was eluted successively with mixtures of benzene and cyclohexane and then with benzene and finally with a mixture of benzene and ethyl acetate. The eluates were evaporated to yield a crude product, M.P. 102–108° C. This product was recrystallised from aqueous ethanol (40% water) and yielded 3-methylthio-10-[3 - (4 - hydroxymethyl-1-piperidyl)propyl]-phenthiazine (4 g.) as white crystals, M.P. 108° C.

The starting material, 3-methylthio-10-(3-methanesulphonyloxypropyl)phenthiazine, was obtained by condensing methanesulphonyl chloride in anhydrous pyridine with 3-methylthio-10 - (3 - hydroxypropyl)phenthiazine. This latter compound was itself prepared by the action of hydrochloric acid in ethanol on 3-methylthio-10-(3-tetrahydropyranyloxy-propyl)phenthiazine, itself prepared by condensing 1-chloro-3-tetrahydropyranyloxy propane with 3-methylthio-phenthiazine (M.P. 140° C.) in xylene in the presence of sodamide.

All the intermediate products may be used in crude or resinous condition.

We claim:
A compound selected from the class consisting of 3-methyl - thio-10-[3-(4-hydroxymethyl-1-piperidyl)propyl] phenthiazine of the formula:
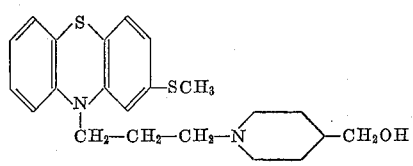
and the acid addition salts thereof having therapeutically acceptable anions.
References Cited in the file of this patent
UNITED STATES PATENTS
2,928,767 Gulesich et al. _____ Mar. 15, 1960
3,075,976 Jacob et al. _____ Jan. 29, 1963
FOREIGN PATENTS
552,836 Belgium _____ May 22, 1957
561,550 Belgium _____ Oct. 31, 1957